United States Patent Office 3,152,685
Patented Oct. 13, 1964

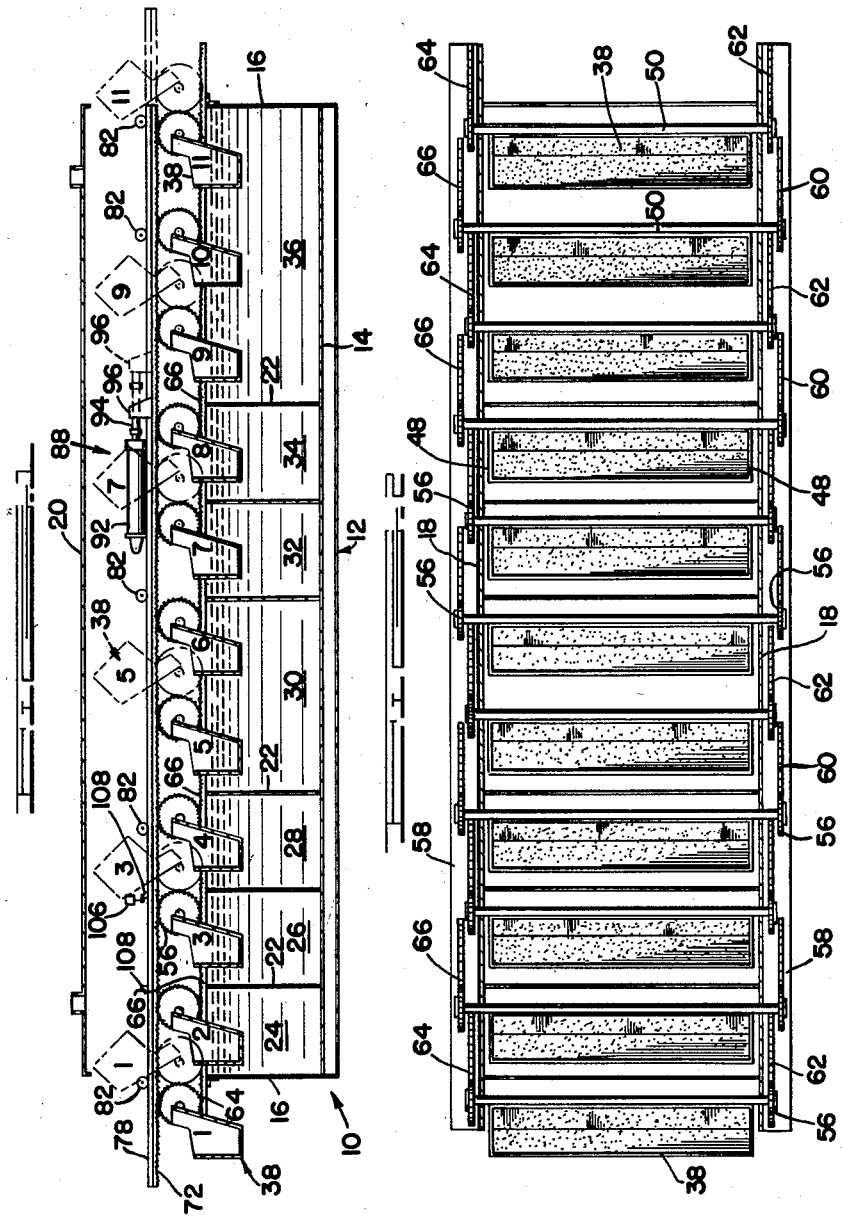

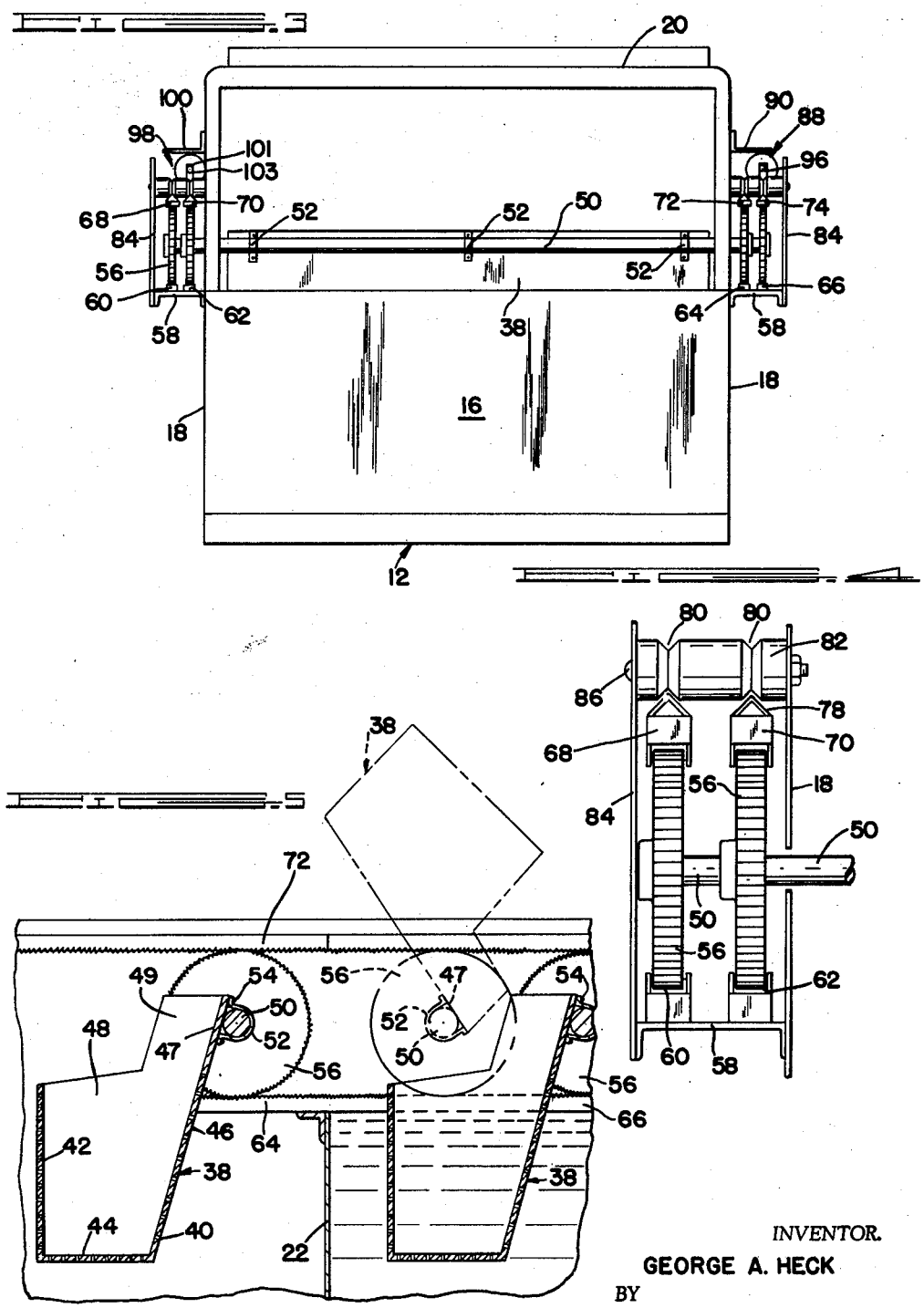

3,152,685
RECIPROCATING-TYPE CONVEYOR
George A. Heck, 24221 Mound Road, Warren, Mich.
Filed Sept. 25, 1961, Ser. No. 141,254
8 Claims. (Cl. 198—218)

This invention relates generally to material processing apparatus and more particularly to a material processing machine in which the material being processed is conveyed and is intermittently agitated and tumbled during the conveying operation to insure an intimate contact of the material with the processing medium.

In bulk processing operations of the type to which this invention relates, there is both a conveying of material from one point to another and an intermittent tumbling or agitating of the bulk material to insure an intimate contact of the material with a processing medium. For example, in the electric plating or other liquid treatment of small parts or the washing of bulk material, such as small parts or food items, such as beans, peas or the like, the parts or food items must be thoroughly tumbled in the plating, treating or washing fluid to insure an intimate contact of the fluid with all the parts or food items. Also, in the drying of material, such as small parts or bulk food items, the material must be tumbled or agitated thoroughly to insure sufficient contact with a drying atmosphere to accomplish an efficient drying of the material.

It is an object of this invention, therefore, to provide an improved bulk processing machine in which the material is both conveyed and intermittently thoroughly tumbled and agitated.

A further object of this invention is to provide a machine of this type which can be readily adapted to a variety of processes, is readily cleaned and changed over from one process to another, and is economical to manufacture and operate.

Another object of this invention is to provide a bulk processing machine which utilizes a plurality of movably mounted containers or hoppers which are moved by means of a rack and wheel assembly so that the material is transferred from one container to the next to effect a progressive movement of the material from one end to the other of the machine, and in which the containers are shaped to avoid a lumping together of the material when in the container and so that transfer of material from one container to the next is accomplished without any spillage of material.

A further object of this invention is to provide a bulk processing machine in which the containers are attached to rolling shafts so that in response to rolling movement of a shaft, the container thereon is concurrently inverted and moved toward the adjacent container to a dumping position above the adjacent container.

Still another object of this invention is to provide a bulk processing machine in which the even and odd numbered containers in a line are alternately actuated to accomplish transfer of material from one to the other end of the line.

Further objects, features and advantages of this invention will become apparent from a consideration of the following description, the appended claims, and the accompanying drawing in which:

FIGURE 1 is a longitudinal sectional view of the machine of this invention with a side wall of the machine removed for the purpose of clarity, and illustrating some of the containers in the machine in broken lines in inverted dumping positions;

FIGURE 2 is a top view of the machine of this invention with the cover therefor removed for the purpose of clarity;

FIGURE 3 is an end view of the machine of this invention;

FIGURE 4 is an enlarged detail view of a portion of the machine of this invention; and FIGURE 5 is a fragmentary longitudinal sectional view of a portion of the machine of this invention illustrating a pair of adjacent containers in the machine, and showing one of the containers in a dumping position in broken lines.

With reference to the drawing, the bulk processing machine of this invention, indicated generally at 10, is illustrated in FIG. 1 as including a main frame 12, which in the illustrated form of the invention is a tank having a bottom wall 14, end walls 16, side walls 18 and a top wall or cover 20. The tank 12 is also provided with transverse partitions 22 which are spaced apart so as to divide the tank into separate chambers 24, 26, 28, 30, 32, 34 and 36 which vary as to size in a direction lengthwise of the tank 12 and are adapted to be filled to the level indicated with treating fluids.

The machine 10 also includes a plurality of containers or hoppers, each of which is indicated generally at 38 (FIGS. 1 and 5). Each container 38 is formed of a sheet material provided with perforations 40 so that fluid can flow freely through the walls of the container 38, and has a generally upright front wall 42, a substantially flat bottom wall 44 and an upwardly and rearwardly inclined rear wall 46. The rear wall 46 is provided with an upwardly extending imperforate extension 47 which projects above the front wall 42 for a purpose to appear later. Each container 38 also has side walls 48 which are formed at their rear ends with upward extensions 49 which extend to the full height of the rear wall extension 47. At their front ends the side walls 48 are of a length corresponding to the height of the front wall 42. For convenience of description the containers 38 are also provided with additional number designations from 1 to 11, inclusive, in FIG. 1 and the containers 1, 3, 5, 7, 9 and 11 are hereinafter referred to as the odd numbered containers and the containers 2, 4, 6, 8 and 10 are hereinafter referred to as the even numbered containers.

A plurality of container supporting shafts 50 extend transversely of the machine 10 and correspond in number to the number of containers 38. Each shaft 50 is secured to the container 38 which it supports by a plurality of generally U-shape brackets 52 which extend partially about the shaft 50 and are secured to the container rear wall extension 47 by suitable means, such as removable bolts or screws 54. In the illustrated embodiment of the invention three brackets 52 (FIG. 3) are utilized for attaching each container 38 to its shaft 50.

Supported on and rigidly secured to the opposite ends of each shaft 50 are a pair of toothed wheel members 56, which may take the form of gears, sprockets or the like. As shown in FIG. 2, the shafts 50 for the odd number containers are of substantially the same length and the shafts 50 for the even numbered containers are also of the same length which is greater than the length of the shafts 50 for the odd numbered containers. As a result, the toothed wheel members 56 for the even numbered containers are transversely offset from the toothed wheel members 56 for the odd numbered containers.

A pair of channel frame members 58 are secured to and projected outwardly from opposite sides of the main frame 12 and support four transversely spaced rows of stationary toothed members 60, 62, 64 and 66. The stationary toothed members 60, 62, 64 and 66 are in the form of racks, sprocket chain sections, or the like and in the illustrated embodiment of the invention are shown as being in the form of short rack sections. Also, if desired, the rack members 60, 62, 64 and 66 in each row may take the form of a continuous single rack member, if desired, it being understood that the rack members are shown in spaced sections merely for illustrative purposes. The rack members 60 are aligned in a direction longitudinally of the machine 10 and support the toothed wheel members 56 on one of the ends of the shafts 50 which support the even numbered containers. The rack members 66 are arranged in a similar line on the opposite side of the machine 10 so that they are aligned in a direction longitudinally of the machine 10 and support the toothed wheel members 56 on the opposite ends of the shafts 50 for the even numbered containers. The rack members 62 are positioned adjacent and transversely inwardly of the rack members 60 and are likewise aligned in a direction longitudinally of the machine 10 for supporting the toothed wheel members 56 on one of the ends of the shafts 50 for the odd numbered containers 38. The rack members 64 are positioned adjacent and transversely inwardly of the rack members 66 and are aligned longitudinally of the machine 10 for supporting the toothed wheel members 56 on the opposite ends of the shafts 50 for the odd numbered containers.

Four rack members 68, 70, 72 and 74 are positioned above and in vertical alignment with the rows of stationary rack members 60, 62, 64 and 66, respectively. The rack members 68, 70, 72 and 74 are positioned in meshing engagement with the toothed wheel members 56 which are supported on and positioned in meshing engagement with the rack members 60, 62, 64 and 66 so that the toothed wheel members 56 are confined between the rack members. Consequently, on reciprocal movement of the upper rack members 68, 70, 72 and 74, which are hereinafter referred to as movable rack members, the toothed wheel members 56 are rotated and advanced longitudinally along the rack members 60, 62, 64 and 66. To maintain each of the movable rack members in engagement with the toothed wheel members 56 with which it is vertically aligned, each of the movable rack members 68, 70, 72 and 74 is provided on its top side with an upwardly extending guide member 78 which is of a substantially inverted V-shape. The guide members 78 project into V-shape grooves 80 formed in roller members 82 which are supported on the main frame 12 at positions above the movable rack members 68, 70, 72 and 74. A plurality of upright supporting bars 84 are secured to and extend upwardly from the frame members 58 for supporting the rollers 82. Each of the rollers 82 is rotatably supported on a bolt 86 which is connected to and extends between a supporting bar 84 and a main frame side wall 18. The rollers 82 are mounted at longitudinally spaced positions on the main frame 12 so that each of the movable rack members 68, 70, 72 and 74 has its guide member 78 projected into the roller grooves 80 at a sufficient number of locations longitudinally of the movable rack member to maintain it in meshing engagement with the toothed wheel members 56 with which it is vertically aligned. Since only longitudinally spaced sections of each movable rack member are utilized to move the wheel members 56 the limited distance required, each movable rack member may be constructed in longitudinally spaced sections secured to the underside of the corresponding guide member 78 to eliminate unnecessary costs.

A hydraulic cylinder assembly, indicated generally at 88, is mounted on a bracket 90 (FIG. 3) secured to one of the main frame side walls 18. The hydraulic cylinder assembly 88 includes a cylinder 92 which is secured to the bracket 90 and a piston rod 94 which is secured to an upwardly extending projection 96 attached to the movable rack member 74. A similar hydraulic cylinder assembly 98 is mounted on a bracket 100 attached to the opposite side wall 18 and has its piston rod 101 attached to an upward projection 103 on the movable rack member 70. On actuation of the cylinder assembly 88 to extend the piston rod 94 to move the projection 96 to the broken line position shown in FIG. 1, the movable rack member 74 is moved from left to right as viewed in FIG. 1 to in turn roll the toothed wheel members 56 for the even numbered containers in a direction from left to right on the stationary rack members 60 and 66. During such rolling movement both a rotational and a translatory movement of the wheel members is effected. During this movement of the even numbered containers, the movable rack member 68 is driven by the toothed wheel members 56 with which it is vertically aligned so that it moves with the rack member 74. On retraction of the piston rod 94, the rack members 68 and 74 are moved from right to left in FIG. 1 to in turn roll the toothed wheel members 56 from right to left on the stationary rack members 60 and 66. Similarly, on actuation of the hydraulic cylinder assembly 98 to extend the piston rod 101, the racks 70 and 72 are moved from left to right in FIG. 1 to roll the toothed wheel members 56 with which they are vertically aligned from right to left on the stationary rack members 62 and 64, and when the piston rod 101 is retracted the wheel members 56 for the odd numbered containers 38 are moved in a reverse direction.

Any suitable control system is provided for automatically alternately reciprocating the pairs of rack members 68, 74 and 70, 72. A limit switch 106 may be mounted on each side of the main frame 12 for actuation by stops 108 on each pair of movable rack members 68, 74 and 70, 72 to automatically control the reciprocation of the movable rack members. In such case each limit switch 106 controls a hydraulic control circuit which supplies fluid to a corresponding hydraulic cylinder assembly 88 or 98.

The rack members 68 and 74 are in effect connected through the shafts 50 and wheel members 56 for the even numbered containers 38 so that they move in unison, and the rack members 70 and 72 are similarly connected by the shafts 50 and wheel members 56 for the odd numbered containers so that they move in unison. It is to be understood that if desired, the rack members 70 and 72 may be rigidly connected and driven by any suitable common driving means such as a hydraulic cylinder assembly, a rack and pinion arrangement, or a rotating crank, and the rack members 70 and 72 may also be so connected and driven.

In the operation of the machine 10, bulk material to be processed is loaded into No. 1 container and the fully processed material is removed from the machine 10 when it is dumped out of container No. 11. On actuation of the hydraulic cylinder assembly 98 to move the movable rack 70 from left to right as viewed in FIG. 1, the toothed wheel members 56 on the shafts 50 for the odd numbered containers 38 are rolled along the fixed rack members 62 and 64 so that they are moved from their solid to their broken line positions shown in FIG. 1. This movement of the toothed wheel members 56 for the odd numbered containers also moves the movable rack member 70 so that it moves concurrently with the rack member 72. When the toothed wheel members 56 for the odd numbered containers are moved from their solid to their broken line positions, the rolling shafts 50 are also rolled in a clockwise direction to effect both a rotational and a translatory movement of the odd numbered containers 38 so that the containers are rotated in a clockwise direction to inverted dumping positions and are moved to positions above the adjacent even numbered containers 38, as shown in broken lines in FIG. 1.

As best appears in FIG. 5, when a container 38 is moved with its supporting rolling shaft 50, it is moved from a material containing position in which its bottom wall 44 is substantially horizontal to an inverted position in which the contents of the container are dumped therefrom. As also shown in FIG. 5, during such movement the container 38 moves upwardly over the top end of an adjacent partition 22, which is shown extending upwardly to the level of the stationary rack members and which may extend upwardly to a level just below the shafts 50 without interfering with container movement. In the inverted position of the container 38, the back wall extension 47 and the adjacent extensions 49 of the side walls 48 constitute a downwardly inclined spout on the container 38 which guides the material being dumped from the container into the adjacent container 38 disposed therebelow to thereby avoid any likelihood of spillage of material during dumping of a container.

It can thus be seen that in response to a movement of the movable racks 70 and 72 from left to right as viewed in FIG. 1, the container No. 1 is moved to an inverted position above container No. 2 so as to dump the contents of container No. 1 into container No. 2. At the same time containers 3, 5, 7 and 9 are moved to dumping positions above containers 4, 6, 8 and 10 and container 11 is moved to a dump position. The hydraulic cylinder assembly 98 is then operated to retract the movable racks 70 and 72 so as to return the toothed wheel members 56 engaged therewith to their solid line positions shown in FIG. 1 to thereby return the odd numbered containers to their material containing positions. The hydraulic cylinder assembly 88 is then actuated to move the piston rod 94 therefor from left to right as viewed in FIG. 1 to move the racks 68 and 74 from left to right to accomplish a similar movement of the even numbered containers 38 to dumping positions in which their contents are transferred to the adjacent odd numbered containers on the right-hand sides thereof. The cylinder assembly 88 is then actuated to retract the piston rod 94 to return the even numbered containers to their containing positions and the above cycle is then continuously repeated to accomplish a successive movement of material from container No. 1 through each of the containers until it is finally dumped from container No. 11 for further handling. A new batch of material to be treated may be deposited into the No. 1 container each time it resumes its material containing position shown in full lines in FIG. 1.

The time of treatment of the material in a given tank chamber is regulated by the locating of the partitions 22. For example, the material is subjected to the fluid in the two container chamber 30 twice as long as it is subjected to the fluid in the single container chambers 24, 26, 28, 32 and 34. Likewise, the material is subjected to the action of the fluid in the three container chamber 36 three times as long as it is to the fluid in the chambers 24, 26, 28, 32 and 34. The partitions 22 may be positioned at selected locations in the tank to effect the desired treatment of the bulk material for the particular process in use.

The construction of each container 38 so that it has a flat bottom wall 44 and straight side walls 42 and 46 prevents a lumping together of the material in the bottom end of the container, as is the case with containers having rounded bottom walls. Consequently, an intimate contact of the fluid in each chamber with the material in the container 38 in that chamber is assured. Likewise, when the container 38 is moved to an inverted position, shown in broken lines in FIG. 5, the material therein is progressively expelled through the spout formed on the container so as to obtain an intimate contact of the material with the processing medium contained in the container 38 into which the material is dumped. In other words, the material is dumped from the container 38 in a stream, as contrasted to a lump or mass, so as to obtain an intimate contact of the processing medium with each unit of the material.

By virtue of the fact that movement of a container 38 to a dumping position is accomplished by both rotational and translatory movement of the container, adjacent containers in the machine 10 are spaced horizontally. This horizontal spacing of the containers provides access to the tank chambers between the containers so that it is not necessary to remove the containers in order to obtain this access. Such access permits the removal of such things as sludge from the top of the fluid in the tank 12 without removing the containers. In the event removal of the containers is required, each container 38 is readily removed by removing the brackets 50 for the container. Also, all of the containers 38 are readily removed by merely removing the guide rollers 82 and the movable racks 68, 70, 72 and 74 so that the containers with their supporting shafts 50 and toothed wheel members 56 can be removed.

In a continuous drying operation using the machine 10, the partitions 22 are removed and the frame 12 may take the form of an open framework. If desired, a drying atmosphere may then be circulated through and around the containers 38 or the material may be air dried. Also, if desired the fluid may be eliminated from a tank chamber and a drying or a treating gas may be supplied to the chamber to effect drying or treating of the material as a step in a liquid treating process.

It will be understood that the bulk processing apparatus which is herein disclosed and described is presented for purposes of explanation and illustration and is not intended to indicate limits of the invention, the scope of which is defined by the following claims.

What is claimed is:

1. In material processing apparatus, a longitudinally extending main frame, transversely spaced stationary rack means extending longitudinally of and supported on said main frame, a plurality of containers spaced longitudinally of said main frame and extending transversely thereof, a plurality of container supporting members arranged in substantially axially aligned pairs so that the members in each pair are spaced transversely of said main frame, each of said supporting members comprising a toothed wheel positioned in meshing engagement with said rack means and movable back and forth along said rack means, means securing each of said containers to a pair of said supporting members so that upon movement of said pair of supporting members along said rack means in one direction said container is concurrently rotated and moved in said one direction, second reciprocatable rack means positioned in meshing engagement with alternate pairs of said supporting members and reciprocatable to move said alternate pairs of said supporting members backs and forth along said first rack means, third reciprocatable rack means positioned in meshing engagement with other ones of said supporting members and reciprocatable to move said other ones of said supporting members along said first rack means, and means on said main frame connected to said reciprocatable rack means for alternately reciprocating said second and third rack means.

2. In material processing apparatus, a main frame, a pair of horizontally spaced containers, substantially horizontal track means on said main frame, supporting means for each of said containers rollingly mounted on said track means for rotational movement and for concurrent translatory movement on said track means a predetermined distance, and means securing one of said containers to the supporting means therefor in an upright position so that on said movement of said one supporting means said predetermined distance on said track means relative to the supporting means for the other container said one container is concurrently inverted and moved to a position above the other container.

3. In material processing apparatus, a main frame, an upright container, track means on said main frame, container supporting means rollingly mounted on said track means for concurrent rotational and translatory movement thereon, and means mounting said container in an upright position on said container supporting means so that on rolling movement of said supporting means a predetermined distance on said track means said container is concurrently inverted and moved said predetermined distance.

4. In material processing apparatus, a main frame, a plurality of open top containers movably mounted on said main frame and arranged in a generally horizontally extending line, coacting toothed wheel and rack means mounting each of said containers on said main frame for concurrent rotational and translatory movement in one direction to an inverted position disposed above the adjacent container in said line, means for concurrently moving a first group of said containers comprising alternate ones of said containers in said line so that said alternate ones of said containers are moved to inverted positions, and means for concurrently moving other alternate ones of said containers in said one direction to similar inverted positions.

5. In material processing apparatus, a main frame, a plurality of open top containers movably mounted on said main frame and arranged in a generally horizontally extending line, means mounting each of said containers on said main frame for concurrent rotational and translatory movement to an inverted position disposed above the adjacent container in said line, means for concurrently moving a first group of said containers comprising alternate ones of said containers in said line so that said alternate ones of said containers are moved to inverted positions, and means for concurrently moving the remaining ones of said containers to inverted positions.

6. In material processing apparatus, a longitudinally extending main frame, transversely spaced stationary rack means extending longitudially of and supported on said main frame, a plurality of toothed wheel members positioned in meshing engagement with said rack means for rolling movement back and forth along said rack means, said wheel members being arranged in substantially axially aligned pairs with the members in each pair being spaced transversely of said main frame, an axle shaft connected to and extending between the toothed members in each pair, a plurality of containers spaced longitudinally of said main frame and extending transversely thereof, each of said containers being positioned between a pair of said toothed wheel members, bracket means releasably securing each of said containers to the axle shaft for the pair of wheel members between which said container is positioned so that upon rolling movement of said pair of wheel members along said rack means in one direction said container is concurrently rotated and moved in said one direction, second reciprocatable rack means positioned in meshing engagement with alternate ones of said wheel members and reciprocatable to roll said alternate ones of said wheel members back and forth along said first rack means, third reciprocatable rack means positioned in meshing engagement with other ones of said wheel members and reciprocatable to roll said other ones of said wheel members along said first rack means, and roller means mounted on said main frame engaged with said reciprocatable rack means so as to maintain said reciprocatable rack means in meshing engagement with said wheel members.

7. In material processing apparatus, a longitudinally extending main frame, a plurality of shafts supported on said main frame and extending transversely thereof, said shafts being arranged in a predetermined spaced apart relation in a direction longitudinally of said main frame and being mounted for rolling movement in said direction, a plurality of containers spaced longitudinally of said main frame corresponding to the spacing of said shafts and extending transversely thereof, means securing each of said containers to one of said shafts, and means for rolling each of said shafts toward the adjacent shaft, said shafts and said containers being spaced so that on rolling movement of a shaft toward the adjacent shaft a distance to invert the container secured thereto said container is positioned above the container secured to said adjacent shaft.

8. In material processing apparatus, a main frame, a plurality of spaced containers mounted on said frame, each of said containers being movable between an upright material containing position and a substantially inverted dumping position above the adjacent container, each container in its upright position having an upright front wall, a substantially horizontal bottom wall, an upwardly and rearwardly inclined rear wall, and side walls extending between said front and rear walls, means on said side and rear walls forming upward extensions which cooperate to form a downwardly extending spout in the dumping position of said container, and rolling shaft means secured to the upward extension of said rear wall of each one of said containers and rollable toward and away from the adjacent container for moving said one container between said containing and dumping positions therefor.

References Cited in the file of this patent
UNITED STATES PATENTS

| | | |
|---|---|---|
| 2,267,190 | Claffy | Dec. 23, 1941 |
| 2,375,630 | Davis | May 8, 1945 |
| 2,894,616 | Young | July 14, 1959 |